United States Patent [19] [11] 3,988,547
Cicognani et al. [45] Oct. 26, 1976

[54] TELECOMMUNICATION SYSTEM HAVING MEANS FOR CONVERTING MULTIFREQUENCY SELECTION SIGNALS INTO DIGITAL PULSE TRAINS

[75] Inventors: Enrico Cicognani; Riccardo Caldarella; Athos Antonini; Alfonso Lamartina, all of Milan, Italy

[73] Assignee: Societa Italiana Telecomunicazioni Siemens S.p.A., Milan, Italy

[22] Filed: Jan. 29, 1975

[21] Appl. No.: 545,219

[30] Foreign Application Priority Data
Jan. 29, 1974  Italy .................................. 19917/74

[52] U.S. Cl. ............................................ 179/16 EC
[51] Int. Cl.² .......................................... H04Q 1/30
[58] Field of Search ................................. 179/16 EC

[56] References Cited
UNITED STATES PATENTS
3,291,913  12/1966  Hanna et al. .................... 179/16 EC
3,453,391  7/1969  Hubbell ........................... 179/16 EC Primary Examiner—William C. Cooper
Attorney, Agent, or Firm—Karl F. Ross; Herbert Dubno

[57] ABSTRACT

A multiplicity of subscriber lines, originating at telephone stations equipped partly with dials and partly with keyboard-controlled multifrequency generators, are connected to pulse-responsive selection equipment by way of switching circuits which are under the control of respective key-signal detectors. Upon the operation of any multifrenquency generator, the latter emits a key signal which actuates the associated detector to switch that line to a conversion network wherein the incoming frequency combinations are translated into binary codes which are stored in a dynamic memory whence they are read out into an available binary/decimal converter. The stored binary codes are accompanied by a line address which enables a coupler to reinsert the selection signals, in the form of digital pulse trains, into the correct line with the aid of an associated interface unit. The selection signals from the subscriber lines and the outputs of the binary/decimal converters are sampled at different rates consistent with the respective numbers of lines and converters. A separate stage in the coupler enables the transmission of data over a line by means of its keyboard upon actuation of an extradigital pushbutton producing a special code.

10 Claims, 3 Drawing Figures

TELECOMMUNICATION SYSTEM HAVING MEANS FOR CONVERTING MULTIFREQUENCY SELECTION SIGNALS INTO DIGITAL PULSE TRAINS

CROSS-REFERENCE TO RELATED APPLICATION

This application relates to subject matter disclosed in commonly owned application Ser. No. 332,696 filed by three of us (Enrico Cicognani, Alfonso Lamartina and Riccardo Caldarella) on Feb. 15, 1973, abandoned and replaced by continuation-in-part application Ser. No. 551,403 filed Feb. 20, 1975, now U.S. Pat. No. 3,940,749.

FIELD OF THE INVENTION

Our present invention relates to a telephone or other telecommunication system wherein a central office serves a multiplicity of incoming lines originating at subscriber stations provided with digital signaling means for identifying a called party, the signaling means including the usual dialing disk in some instances and keyboard-type multifrequency generators in other instances.

BACKGROUND OF THE INVENTION

The conventional dialing disk is being gradually displaced by keyboards with pushbuttons whose operation causes the generation of predetermined frequencies associated with respective digits, usually pairs of frequencies selected from two groups of four frequencies each. The installation of such multifrequency generators is advantageous for the subscriber in that it speeds up and simplifies the transmission of call digits; problems arise, however, where keyboard-equipped stations coexist with dial-equipped stations in a group of lines terminating at a common exchange whose selector stages are necessarily designed to handle digital pulses generated by the dialing disk.

OBJECTS OF THE INVENTION

The general object of our present invention, therefore, is to provide means in such a system for converting the multifrequency selection signals from keyboard-equipped apparatus into digital pulse trains, thereby obviating the need for providing separate line selectors for the two classes of subscriber stations served by the exchange.

Another object is to provide means in such an exchange for enabling the use of the keyboard as a data transmitter with partial utilization of the same conversion circuitry.

SUMMARY OF THE INVENTION

In accordance with our present invention, a characteristic signal (hereinafter referred to as a key signal) indicative of the use of a multifrequency generator actuates a detector circuit to switch the arriving line signals from their usual path, terminating at pulse-train-responsive selector means, to an alternate path including first conversion means for translating multifrequency signals into binary signal codes, a memory for the simultaneous storage of signal codes from different subscriber lines, line-identifying means controlled by the detector circuits for generating an individual address code accompanying each signal code in the memory, second conversion means connected to the memory for receiving the signal codes therefrom together with the accompanying address codes and translating these signal codes into digital pulse trains, and a coupler for introducing the digital pulses so generated into the subscriber lines identified by the accompanying address codes, such introduction taking place at a location between the detector-controlled switches and the first selector stage.

The first conversion means may be part of a line concentrator of the type disclosed in our prior U.S. Pat. No. 3,819,869 issued June 25, 1974. Such a line concentrator includes a binary counter serving as an address generator, the counter being stepped by clock pulses and working into a plurality of call registers by way of normally blocked gating circuits which are unblocked whenever an address in its output matches the designation of a line found to be active. The contents of these call registers, including both signal codes and address codes, can be read out at a rapid rate into available stages of the memory which advantageously is of the dynamic type described in the above-identified application Ser. No. 332,696 whose disclosure we mean to incorporate by reference in the present application. Such a memory includes three cascaded registers interconnected in a closed loop, i.e. a multistage shift register, a one-stage buffer register and a one-stage extraction register. Stored codes are read out into available receiving circuits from the output of the extraction register which is then short-circuited until the recurrence of a predetermined heading code; this ensures that the next signal and address bits to be stored in the memory are invariably entered in the last time slot of a memory cycle. Thus, the codes received from the first (analog/digital) conversion means retain their relative time position within the memory until they are read out to the second (binary/decimal) conversion means, generally at a rate different from their rate of entry.

According to a more particular feature of our present invention, the second conversion means comprises a plurality of binary/decimal converters each divided into a signal section and an address section, the signal section comprising a multistage binary counter presettable by a signal code fed to it from the memory upon the unblocking of a gate circuit in the cleared condition of the counter. A source of stepping pulses for this counter, provided with an output connection leading to the coupler, advances the count to a predetermined value whereupon the output connection is blocked but stepping continues until the counter is reset to zero, i.e. cleared. At that point the address section of the converter is also cleared so that both sections are ready to receive new codes.

Thus, the output connection from the pulse source included in the signal section of each converter delivers to the addressed subscriber line a train of digital pulses which, with proper selection of the cut-off value of the counter, corresponds to the call-number digit transmitted by the associated subscriber station. The coupler introducing this pulse train into the line includes, pursuant to a further feature of our invention, a distributor sequentially connected to all the active binary/decimal converters in the course of an operating cycle so as to receive samples of their respective contents on a time-sharing basis. These samples are individually integrated for each line before being transmitted to respective interface units at the aforementioned location downstream of the switching circuits but upstream of the selector stages.

In accordance with still another feature of our invention, the coupler also includes a data stage connected to the memory for receiving signal codes directly therefrom in the presence of a special data code generated by the subscriber with the aid of an additional extradecadic (or extradigital) pushbutton on the keyboard. The data stage, in turn, retransmits these binary signals to the addressed line without conversion into digital pulses.

BRIEF DESCRIPTION OF THE DRAWING

The above and other features of our invention will now be described in detail with reference to the accompanying drawing in which.

SPECIFIC DESCRIPTION

Figure 1:
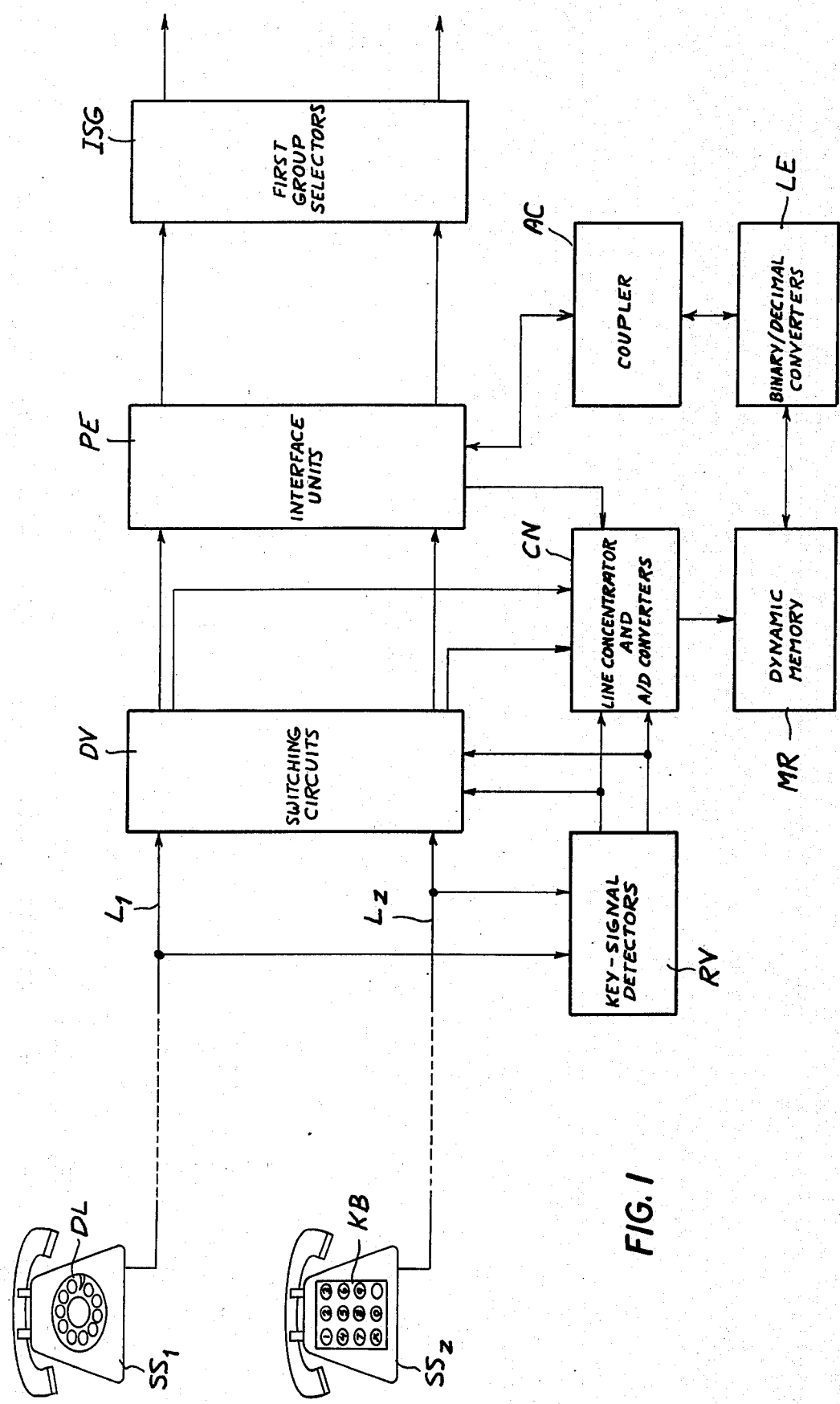
FIG. 1 is a block diagram illustrating part of a central office of a telephone system embodying our invention.

In FIG. 1 we have shown a group of subscriber lines $L_1 - L_z$, the number $z$ of these lines being about 1,000 whereby each of them can be identified by a 10-bit address code. The lines originate at respective subscriber stations $SS_1 - SS_z$, station $SS_1$ being shown equipped with a conventional dialing disk DL whereas station $SS_z$ has instead a keyboard KB with twelve pushbuttons. Ten of these pushbuttons bear the numerals 1, 2, ... 9, 0 for the selection of respective digits in a call number of a party the subscriber wishes to contact. An eleventh button, marked $x$, serves for the transmission of a data signal which is to be sent out immediately before (or possibly after) operation of one of the other pushbuttons for the transmission of numerical information rather than call-number digits over the line. A twelfth button, not labeled, may be used to generate a punctuation mark in such data transmission.

The lines $L_1 - L_z$ extend to a common exchange, or central office, which includes a set of detectors RV individually connected to these lines for ascertaining the presence thereon of a key signal emitted by any keyboard-equipped subscriber station upon actuation of one of its pushbuttons. Switching circuits DV, which may comprise a set of relays as shown in our above-mentioned prior U.S. Pat. No. 3,819,869, are controlled by the key-signal detectors RV to normally establish a signal path from these incoming lines to a set of first group selectors ISG via a set of interface units PE forming part of the peripheral central-office equipment. In the presence of a key signal on any incoming line, the corresponding detector RV causes a switchover of that line to an alternate path extending to a line concentrator CN including a set of analog/digital converters, each of these converters comprising a set of tuned circuits for detecting the different frequency combinations emitted by keyboard KB as is well known per se. The output of the line concentrator CN, whose construction is similar to that disclosed in U.S. Pat. No. 3,819,869, consists of a succession of 14-bit code words including four signal bits and ten address bits, the latter being internally generated within the line concentrator. The codes stored in the several call registers of unit CN are sequentially sampled by a scanner, as described in application Ser. No. 332,696 whose disclosure is incorporated herein by reference. The scanner, stepped by a train of clock pulses, skips those registers which do not contain any significant bits; further reference may be made in this connection to commonly owned U.S. Pat. No. 3,551,888.

Line concentrator CN communicates with interface units PE to activate those units whose addresses are stored in its call registers, causing them to extend the incoming call to an available first group selector ISG; seizure of such a selector is reported back to unit CN which thereupon enters a special bit (designated $k_{15}$ in application Ser. No. 332,696) in a track of a dynamic memory MR in an available time slot containing the fourteen signal and address bits from one of the call registers of the line concentrator in as many other tracks. Dynamic memory MR, constructed as briefly discussed above and as more fully described in application Ser. No. 332,696, preserves the order in which these codes are written in it from the call registers of unit CN as each code word is stored in that memory until it can be read out into an available binary/decimal converter forming part of a set of such converters generally designated LE. These latter converters, as more fully described hereinafter with reference to FIG. 3, translate the binary signal codes into digital pulse trains which are transmitted to individual interface units PE, as identified by the accompanying address codes, through the intermediary of a coupler AC whose construction is shown in greater detail in FIG. 2.

Figure 2:
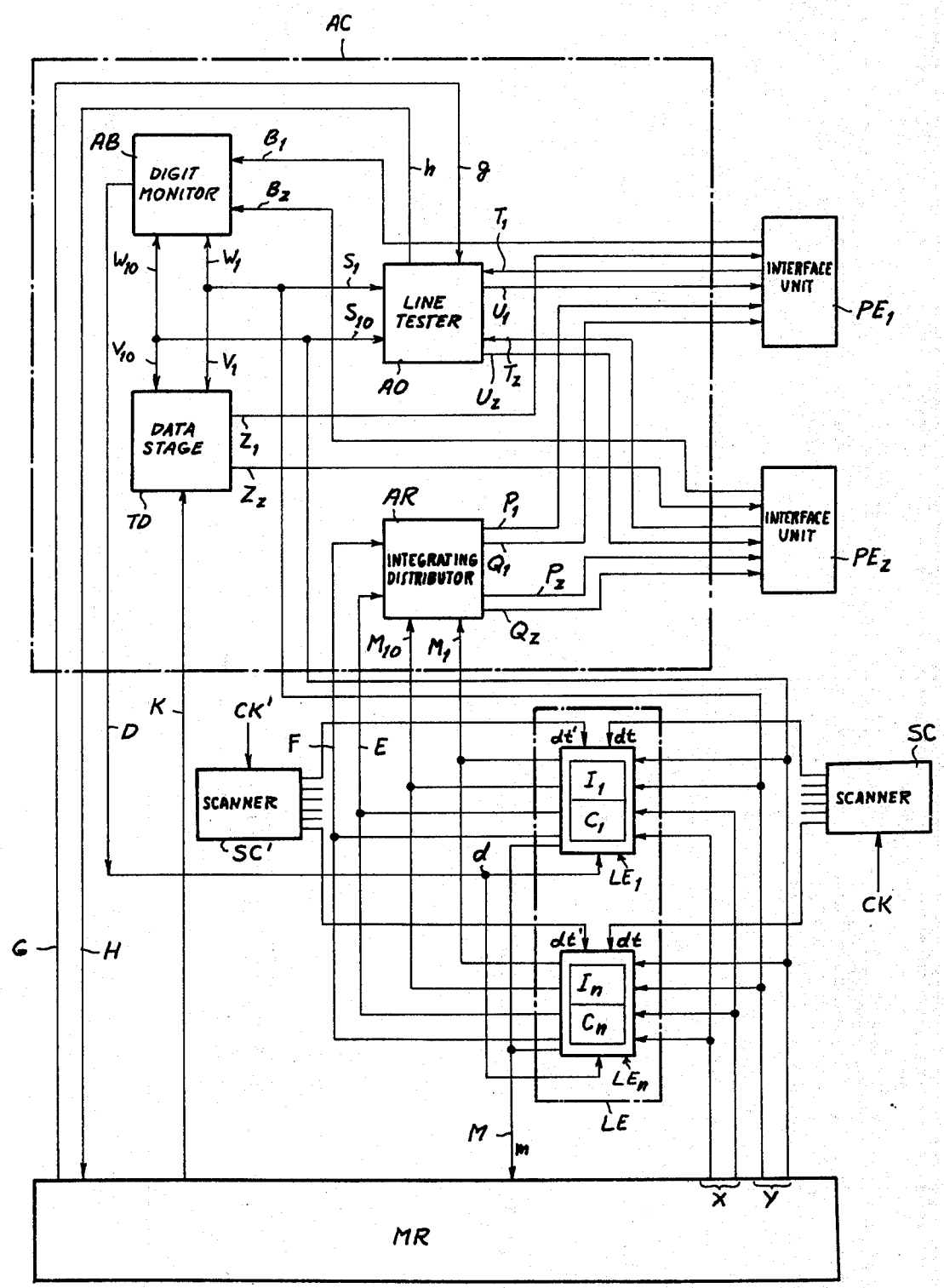
FIG. 2 is a more detailed diagram of certain components of the system shown in FIG. 1.

As illustrated in FIG. 2, conversion network LE comprises a set of converters $LE_1 - LE_n$ with $n$ generally a number substantially smaller than $z$. Each converter is divided into two sections, i.e. a signal section $C_1 - C_n$ and an address section $I_1 - I_n$. Two scanners SC and SC', driven by respective clock pulses CK and CK' from a nonillustrated timer, generate relatively staggered sampling pulses dt and dt' of like cadence which sequentially explore the contents of the several converters $LE_1 - LE_n$.

Coupler AC, communicating with individual interface units $PE_1 - PE_z$, comprises a number of logic matrices including a digit monitor AB, a line tester AO, a distributor AR and a data stage TD. Distributor AR is connected in parallel to all the signal sections $C_1 - C_n$ via a pair of leads E, F and to all the address sections $I_1 - I_n$ via a 10-lead multiple $M_1 - M_{10}$. This matrix also includes integrating circuitry for restoring the original waveforms of the sampled signals.

Lead E carries digital pulses, generated in a manner described hereinafter with reference to FIG. 3, which upon integration are distributed to the several interface units $PE_1 - PE_z$ via leads $P_1 - P_z$ selected on the basis of the address information concurrently arriving over multiple $M_1 - M_{10}$. A continuity signal on lead F remains in existence for the duration of a digital pulse train and for a certain period thereafter; this signal is retransmitted to units $PE_1 - PE_z$ by way of respective leads $Q_1 - Q_z$. Multiples X and Y deliver the signal and address codes from memory MR to the corresponding sections $C_1 - C_n$ and $I_1 - I_n$ of converters $LE_1 - LE_n$; multiple Y has branches $S_1 - S_{10}$, $V_1 - V_{10}$ and $W_1 - W_{10}$ respectively extending to matrices AO, TD and AB.

Leads $B_1 - B_z$, extending from units $PE_1 - PE_z$ to matrix AB, are energized as long as the respective interface units receive continuity signals via leads $Q_1 - Q_z$ to indicate that transmission of a digital pulse train is in progress.

Matrix AB, upon determining the absence of such a continuity signal from the interface unit identified at a particular instant by an address code appearing on branch multiple $W_1 - W_{10}$, energizes a lead D with an enabling signal $d$ applied in parallel to all the converters LE. The coincidence of this enabling signal $d$ with a sampling pulse dt in the input of an idle converter permits the loading thereof with a new code word read out from memory MR via multiples X and Y. Thus, no fresh digital information can be introduced into any of these converters during emission of a digital pulse train therefrom.

If a subscriber aborts a call and immediately initiates another one, an error could result from a signal code still circulating with the corresponding line address in memory MR. In order to prevent this, matrix AO continuously receives activity information from interface units $PE_1 - PE_z$ via respective leads $T_1 - T_z$ and, upon determining that a line identified by an address code on multiple $S_1 - S_{10}$ is no longer active, emits a cancellation signal $h$ to memory MR on a lead H to delete the corresponding code word.

A malfunction of line concentrator CN, resulting in the storage of an address code unaccompanied by a signal code, could also give rise to errors. We therefore provide the memory MR with an output lead G which is energized whenever all the four tracks assigned to the signal-code bits are vacant at the reading point, the resulting signal $g$ activating a corresponding junction in matrix AO (as indicated by the address code on branch multiple $S_1 - S_{10}$) to send a busy signal to the corresponding interface unit $PE_1 - PE_z$ via a respective lead $U_1 - U_z$. In this instance, too, the cancellation signal $h$ is generated to clear the unaccompanied address code from the memory.

An output lead M common to all the converters LE is energized with a signal $m$ whenever one or more of these converters are available for loading, thereby causing the extraction of a code word from that memory.

At K we have indicated a set of conductors extending from memory MR to data stage TD to carry the 4-bit signal code to that stage if this code is recognized as a data word rather than as a digital instruction. Thus, operation of the 11th pushbutton of a keyboard KB (FIG. 1) gives rise to a bit combination read by a special decoder (not shown) which thereupon inserts a marking bit in an additional track, this marking bit causing a switchover of the extracted signal code from multiple X to multiple K. Data stage TD delivers the data word to the proper interface unit, identified by the address concurrently appearing on branch multiple $V_1 - V_{10}$, via a corresponding lead $Z_1 - Z_z$ after converting same into a form suitable for transmission over the line, e.g. a selected frequency combination.

Figure 3:
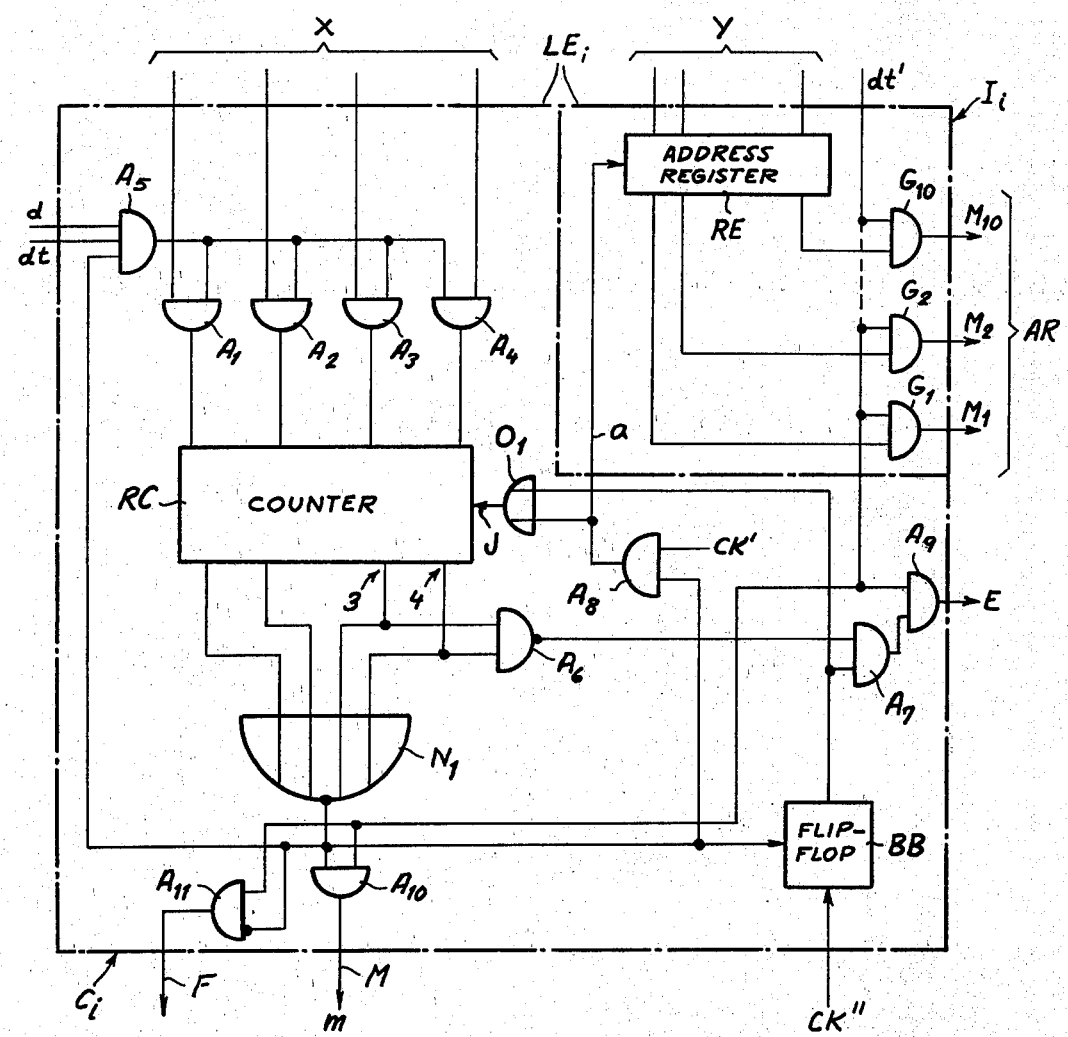
FIG. 3 is a circuit diagram of a binary/decimal converter representative of a set of such converters shown in FIG. 2.

In FIG. 3 we have shown a generic binary/decimal converter $LE_i$ with its signal section $C_i$ and its address section $I_i$. Section $C_i$ comprises a binary counter RC whose four stages provide a count ranging from 0 through 15. Its several stage inputs can be preset by way of respective AND gates $A_1 - A_4$ in the presence of a stepping pulse on an input J. AND gates $A_1 - A_4$ have first inputs connected to respective leads of multiple X and second inputs connected in parallel to the output of a further AND gate $A_5$, the latter having two of its three inputs respectively connected to scanner SC and lead D (FIG. 2) for receiving therefrom the pulses dt and $d$. The third input of gate $A_5$ is connected to the output of a NOR gate $N_1$ with input connections to all four stage outputs of counter RC; gate $N_1$, therefore, conducts only when the counter is in its zero position. Upon thus conducting, NOR gate $N_1$ disables a flip-flop BB and unblocks an AND gate $A_8$, that gate working through an OR gate $0_1$ into stepping input J and being also connected to a writing input of an address register RE whose stages are tied to the leads of multiple Y. Register $RE_i$, which is included in address section $I_i$, has stage outputs terminating at respective AND gates $G_1, G_2 \ldots G_{10}$ whose other inputs are connected in parallel to an output lead of scanner SC' (FIG. 2) carrying the sampling pulse dt'.

Flip-flop BB, when enabled by the absence of an output from NOR gate $N_1$, is alternately set and reset by a train of clock pulses CK" recurring, for example, with a cadence of 50 ms. The output of this flip-flop, therefore, is a square wave with a period of 100 ms., this square wave being fed to another input of OR gate $0_1$ as well as to an input of an AND gate $A_7$ whose other input is tied to the output of a NAND gate $A_6$ having input connections to the No. 3 and No. 4 stage outputs of counter RC. The outputs of AND gate $A_7$ and NOR gate $N_1$ are sampled in the rhythm of pulses dt' with the aid of two further AND gates $A_9$ and $A_{10}$ whose outputs are the leads E and M discussed in conjunction with FIG. 2.

As long as counter RC is reset to zero, the output of NOR gate $N_1$ opens the AND gate $A_8$ to the passage of clock pulses CK' applied to its other input. A start pulse $a$ on the output lead of AND gate $A_8$ then clears the address register RE to make it receptive to another address code read out from memory MR. At that stage, AND gates $A_1 - A_4$ are unblocked upon the simultaneous appearance of pulses $d$ and dt in the input of AND gate $A_5$ thereby letting the accompanying signal code from multiple X preset the counter RC. That signal code is not the equivalent of the transmitted digit but represents its complement to 11, i.e. a decimal value ranging from 10 through 1. The preloading of the counter is effective upon the appearance of a clock pulse CK' which traverses the AND gate $A_8$ and energizes the stepping input J of the counter.

NAND gate $A_6$ conducts as long as the last two stages of counter RC are not energized simultaneously, i.e. up to count 11 inclusive. Thus, the presetting of the counter by the signal code from multiple X de-energizes the NOR gate $N_1$ but leaves the NAND gate $A_6$ with a true output. Flip-flop BB is now enabled to respond to the clock pulses CK", generating a digital pulse in the output of AND gate $A_7$ on the leading (or trailing) edge of every other clock pulse. These digital pulses also step the counter RC, through OR gate $O_1$, until the same reaches its count 12 whereupon NAND gate $A_6$ is cut off and blocks the AND gate $A_7$. The number of digital pulses read out from AND gate $A_8$ in response to sampling pulses dt' corresponds, therefore, to the natural value of the selected digit.

Even with AND gate $A_6$ cut off, flip-flop BB continues to step the counter RC until the same returns to its zero position. At that instant the flip-flop is deactivated, clock pulse CK' gives rise to a start pulse $a$ to clear the address register RE preparatorily to a reloading thereof, and gate $A_5$ is primed for another presetting of counter RC by a new signal code arriving over multiple X.

If no such signal code is waiting, counter RC will remain reset upon the occurrence of successive clock pulses CK', thus causing start pulse $a$ to recur periodically in the same rhythm. If the counter is loaded by a new code, the next start pulse a will occur only after the full count has been reached.

Under the assumed conditions, a pause of at least 500 ms. will intervene between the last digital pulse of a train on lead E and the appearance of the first pulse of the next train.

NOR gate $N_1$ also works into an inverting input of an AND gate $A_{11}$ which likewise receives the sampling pulse dt'. Thus, a continuity signal appears on lead F as long as counter RC is in an off-zero condition. Lead M, extending to memory MR from gate $A_{10}$, carries an availability signal $m$ from this converter only when the counter is cleared, i.e. when NOR gate $N_1$ conducts.

The recurrence or cadence of sampling pulses dt and dt' is, of course, considerably higher than that of clock pulses CK''.

We claim:

1. In a telecommunication system, in combination:
 a multiplicity of subscriber lines originating at calling stations provided with digital signaling means for identifying a called party, said signaling means including multifrequency generators in the case of at least some of said stations;
 selector means responsive to digital pulse trains connected to said subscriber lines for connecting said lines to a called party;
 detector means connected to said subscriber lines between said stations and said selector means for actuation by a characteristic signal indicative of the use of a multifrequency generator;
 first conversion means for translating multifrequency signals into binary signal codes;
 switching means in each subscriber line controlled by said detector means for directing multifrequency signals to said first conversion means in response to the presence of said characteristic signal on the line;
 multistage memory means connected to said first conversion means for the simultaneous storage of signal codes from different subscriber lines;
 line-identifying means controlled by said detector means for generating an individual address code accompanying each signal code in said memory means;
 second conversion means connected to said memory means for receiving said signal codes therefrom together with the accompanying address codes and translating said signal codes into digital pulse trains; and
 coupling means connected to said second conversion means for introducing said digital pulse trains into the subscriber lines identified by the accompanying address codes, at a location between said switching means and said selector means.

2. The combination defined in claim 1 wherein said second conversion means comprises a plurality of binary/decimal converters each divided into a signal section and an address section, and gating means responsive to an unloaded state of said signal section for enabling the transfer of signal and address codes from said memory means to said signal and address sections, respectively.

3. The combination defined in claim 2 wherein said signal section comprises a multistage binary counter presettable by said signal code, a source of stepping pulses for said counter, output means extending from said source to said coupling means, and blocking means for deactivating said output means upon attainment of a predetermined count by said counter, said output means carrying the digital pulse trains derived from said signal codes, said counter being clearable by said stepping pulses after attainment of said count with consequent arresting of said source in a zero position of the counter.

4. The combination defined in claim 3 wherein said coupling means includes monitoring means connected to said subscriber lines downstream of said switching means for ascertaining the termination of the transmission of digital pulses on a line identified by a code in said address section and for preventing another presetting of said counter prior to such termination, 5. The combination defined in claim 3 wherein said source comprises a flip-flop, said counter being provided with coincidence means connected to the several stages thereof for determining the cleared state thereof and thereupon deactivating said flip-flop.

6. The combination defined in claim 2, further comprising scanning means sequentially sampling the contents of said binary/decimal converters, said coupling means including distributing means connected to receive the samples of said contents and integrating means in said distributing means for reconstituting said signal and address codes from said samples.

7. The combination defined in claim 1 wherein said coupling means includes test means for determining the release of a line identified by an address code stored in said second conversion means and for canceling the signal and address code of a released line in said memory means.

8. The combination defined in claim 7 wherein said memory means has an output indicative of the presence therein of an address code unaccompanied by a signal code, said test means being connected to said output for canceling the unaccompanied address in said memory means.

9. The combination defined in claim 1 wherein said multifrequency generators comprise keyboards with ten digital pushbuttons and an extradigital pushbutton for generating a special signal translated by said first conversion means into a data code, said coupling means including a data stage connected to receive said signal codes directly from said memory means in the presence of said data code for retransmission to a subscriber line identified by an accompanying address code.

10. The combination defined in claim 1 wherein said memory means comprises a dynamic memory wherein each stage is periodically connectable to said first and second conversion means.

* * * * *